(12) United States Patent
Stewart

(10) Patent No.: US 11,572,764 B2
(45) Date of Patent: Feb. 7, 2023

(54) $CO_2$ GEOLOGICAL SEQUESTRATION IN SYNCLINAL PONDS

(71) Applicant: Saudi Arabian Oil Company, Dhahran (SA)

(72) Inventor: Simon A. Stewart, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 17/236,313

(22) Filed: Apr. 21, 2021

(65) Prior Publication Data

US 2022/0341294 A1  Oct. 27, 2022

(51) Int. Cl.
E21B 41/00 (2006.01)

(52) U.S. Cl.
CPC ........ *E21B 41/0064* (2013.01); *E21B 41/005* (2013.01); *E21B 41/0042* (2013.01)

(58) Field of Classification Search
CPC .... E21B 41/0064; E21B 47/00; E21B 41/005; E21B 41/0047
See application file for complete search history.

(56) References Cited

U.S. PATENT DOCUMENTS

| | | | | |
|---|---|---|---|---|
| 8,527,205 | B2* | 9/2013 | Legendre | E21B 49/00 703/2 |
| 9,188,697 | B2* | 11/2015 | Badri | E21B 43/164 |
| 9,651,708 | B2* | 5/2017 | Edwards | G01V 7/00 |
| 2011/0042074 | A1* | 2/2011 | Goldberg | E21B 43/164 166/250.01 |

FOREIGN PATENT DOCUMENTS

| | | |
|---|---|---|
| WO | 012114102 A2 | 8/2012 |
| WO | 2012118410 A2 | 9/2012 |

OTHER PUBLICATIONS

Cameron et al., "Optimization of well placement, CO2 injection rates, and brine cycling for geological carbon sequestration", International Journal of Greenhouse Gas Control, vol. 10, pp. 100-112, 2012.
Haugan et al., "Sequestration of CO2 in the deep ocean by shallow injection", Nature, vol. 357. pp. 318-320, May 28, 1992.

(Continued)

*Primary Examiner* — Silvana C Runyan
(74) *Attorney, Agent, or Firm* — Dinsmore + Shohl LLP

(57) ABSTRACT

In accordance with one or more embodiments of the present disclosure, a method of subsurface sequestration of $CO_2$ in a geological basin includes identifying one or more subsurface sequestration locations in the geological basin and injecting an aqueous $CO_2$ solution to be sequestered into the geological basin. The one or more subsurface sequestration locations are regions of deeper geological structure, relative to an adjacent shallower geological structure, into which a negatively buoyant fluid injected into the basin will sink. The aqueous $CO_2$ solution comprises a density that is greater than the density of the water naturally present in the geological basin, such that the injected aqueous $CO_2$ solution pools in the one or more subsurface sequestration locations.

16 Claims, 2 Drawing Sheets

(56) References Cited

OTHER PUBLICATIONS

Pool et al., "Dynamics and design of systems for geological storage of dissolved CO2", Advances in Water Resources, vol. 62, pp. 533-542, 2013.
Shariatipour et al., "An engineering solution for CO2 injection in saline aquifers", International Journal of Greenhouse Gas Control, International Journal of Greenhouse Gas Control, vol. 53, pp. 98-105, 2016.
Sigfusson et al., "Solving the carbon-dioxide buoyancy challenge: The design and field testing of a dissolved CO2 njection system", International Journal of Greenhouse Gas Control, vol. 37, pp. 213-219, 2015.

\* cited by examiner

$CO_2$ GEOLOGICAL SEQUESTRATION IN SYNCLINAL PONDS

TECHNICAL FIELD

Embodiments of the present disclosure generally relate to subsurface sequestration, and pertain particularly to a method of subsurface sequestration of $CO_2$ in a geological basin.

BACKGROUND $CO_2$ emissions into the atmosphere may contribute to adverse impacts of climate change. Methods offsetting or reducing these $CO_2$ emissions include storing or sequestering the $CO_2$ for long time periods, i.e. thousands of years or longer. $CO_2$ can be captured directly at the point of emission, or it can be drawn from the atmosphere. Once captured it can be transported for injection into suitable underground long-term sequestration sites. Carbon dioxide may be injected into the sequestration site as the pure gas, which is buoyant relative to in situ water within the sequestration site regardless of the $CO_2$ phase in the subsurface reservoir—either gas or supercritical fluid (the phase change being depth and therefore pressure dependent). Therefore, injection of pure $CO_2$ requires a trapping mechanism suitable for positively buoyant fluid. Injection of pure $CO_2$, therefore, is restricted to locations where such a particular trap type exists and is subject to uncertainties associated with such traps, such as long-term efficacy of impervious cap rock. These restrictions present a barrier to adopting sequestration of $CO_2$.

SUMMARY

There is a continual need for novel methods for sequestering $CO_2$ in geological basins, including methods for determining where such geological basins, and within those basins, where a structure or structures capable of holding the sequestered $CO_2$ might be found. As an alternative means of sequestering $CO_2$, the $CO_2$ may be mixed with water before or during injection to form a fluid that is more dense than in situ water within the sequestration site. Dense fluids do not require traps, which are required by relatively light, positively buoyant fluids. Embodiments of the present disclosure are directed to such methods.

According to one embodiment, a method of subsurface sequestration of $CO_2$ in a geological basin includes identifying one or more subsurface sequestration locations in the geological basin and injecting an aqueous $CO_2$ solution to be sequestered into the geological basin. The one or more subsurface sequestration locations are regions of deeper geological structure, relative to an adjacent shallower geological structure, into which a negatively buoyant fluid injected into the basin will sink. The aqueous $CO_2$ solution comprises a density that is greater than the density of the water naturally present in the geological basin, such that the injected aqueous $CO_2$ solution pools in the one or more subsurface sequestration locations.

Additional features and advantages of the embodiments described herein will be set forth in the detailed description which follows, and in part will be readily apparent to those skilled in the art from that description or recognized by practicing the embodiments described, including the detailed description and the claims which are provided infra.

BRIEF DESCRIPTION OF THE DRAWINGS

The following detailed description of specific embodiments of the present disclosure can be best understood when read in conjunction with the following drawings in which.

DETAILED DESCRIPTION

Embodiments described herein relate to novel methods for sequestering $CO_2$ in geological basins. A $CO_2$ solution injection system may be added to large-scale aquifers or reservoirs in sedimentary basins. An intrinsic property of sedimentary basins is that only a small proportion of the area of sedimentary basins (usually on the order of 10%) is occupied by structural "highs" that are valid traps for positively buoyant fluids. Therefore, the available area for traditional $CO_2$ sequestration is relatively limited. However, in embodiments, the structural "lows" between structural highs serve as a long-term storage location for $CO_2$.

These and other aspects of the present methods are described in further detail below with reference to the accompanying figures, in which one or more illustrated embodiments and/or arrangements of the systems and methods are shown. In the description of the embodiments that follows, like numerals denote like components across the various figures. The systems and methods of the present application are not limited in any way to the illustrated embodiments and/or arrangements. It should be understood that the systems and methods as shown in the accompanying figures are merely exemplary of the systems and methods of the present application, which can be embodied in various forms as appreciated by one skilled in the art. Therefore, it is to be understood that any structural and functional details disclosed herein are not to be interpreted as limiting the present systems and methods, but rather are provided as a representative embodiment and/or arrangement for teaching one skilled in the art one or more ways to implement the present systems and methods.

Figure 1:
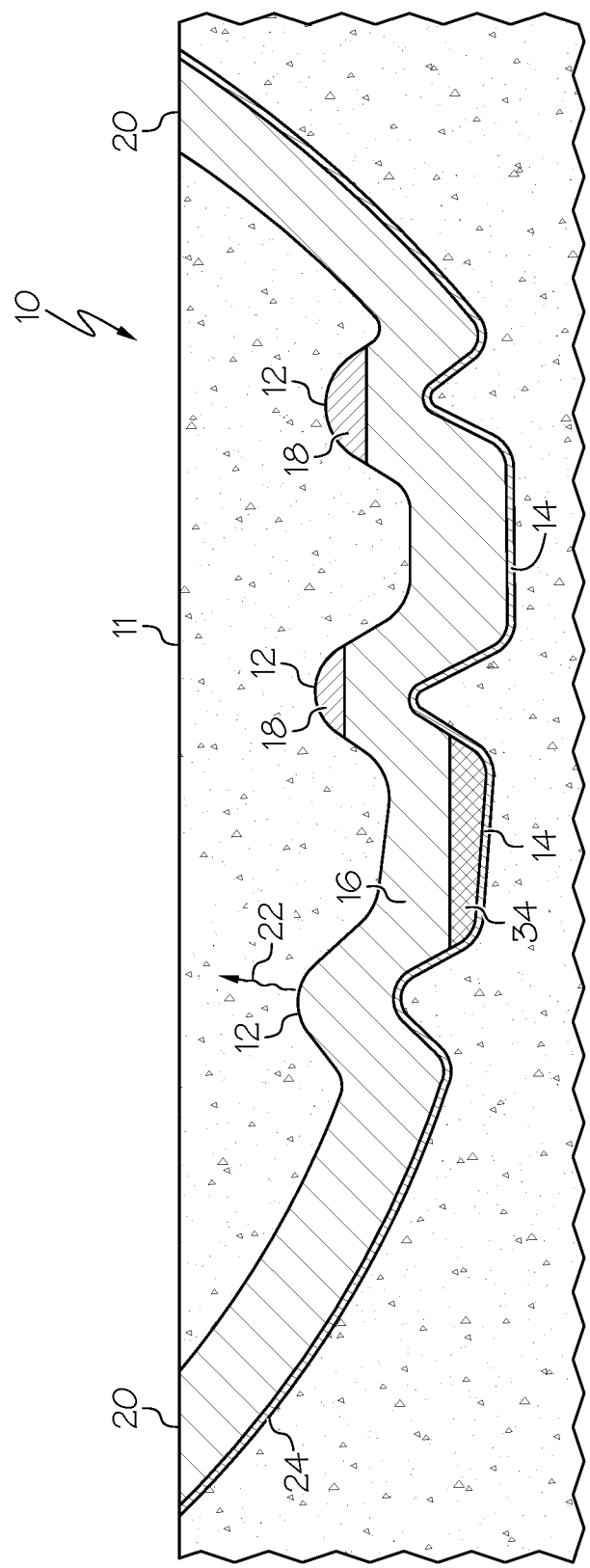
FIG. 1 is a schematic of a geological basin suitable for embodiments described herein.

Referring now to FIG. 1, a geological basin 10, which may include sedimentary material 11, may have a very broad bowl shape with the deepest part being approximately in the middle. However, the overall bowl shape may be interrupted by localized structural highs 12, the span between which forms a subsurface sequestration location 14. In embodiments, the one or more subsurface sequestration locations may be deep regions where relatively high density fluids within the reservoir will pool, adjacent one or more structural regions that are structurally shallower and in which fluids of relatively low density will pool. Although the FIGs. and discussion imply a two-dimensional or cross-section of the subsurface sequestration locations and structurally shallower structural regions, in practice the geological basin 10 will be three-dimensional, and it is three-dimensional shallower structures that will trap positively buoyant fluids and three-dimensional deep subsurface sequestration locations (i.e., "lows" surrounded on all sides by "highs") that will trap negatively buoyant fluids.

A typical geological basin 10 may include saline water 16, which may be more dense than any hydrocarbon mixture 18 that may exist in the geological basin 10. As a result, the hydrocarbon mixture 18 may accumulate in the localized structural highs 12. The geological basin 10 may include one or more locations 20 where reservoirs, that are laterally continuous in the subsurface, are exposed at the surface and may imbibe rainwater. In FIG. 1, one of the localized structural highs 12 is shown as containing a leaky trap 22, which allows the fluid in the localized structural highs 12 to escape into the sedimentary material 11. The leakage is a result of the impervious cap rock, which is a required element of trap configuration for positively buoyant fluids, having significant transmissibility due to fractures or other permeability pathways. As a result, any buoyant fluid may not be retained in the localized structural high 12. The geological basin 10 may include a naturally occurring base seal 24 that prevents downwards leakage of the fluid from the geological basin 10. As a result, a fluid that is more dense than the in situ saline water 16 will migrate to the bottom of the geological basin 10, forming pool 34, but not be able to pass through the base seal 24, such that pools of the more dense fluid may be sequestered in the geological basin 10, or isolated structural lows at a shorter lateral scale than the basin itself.

Figure 2:
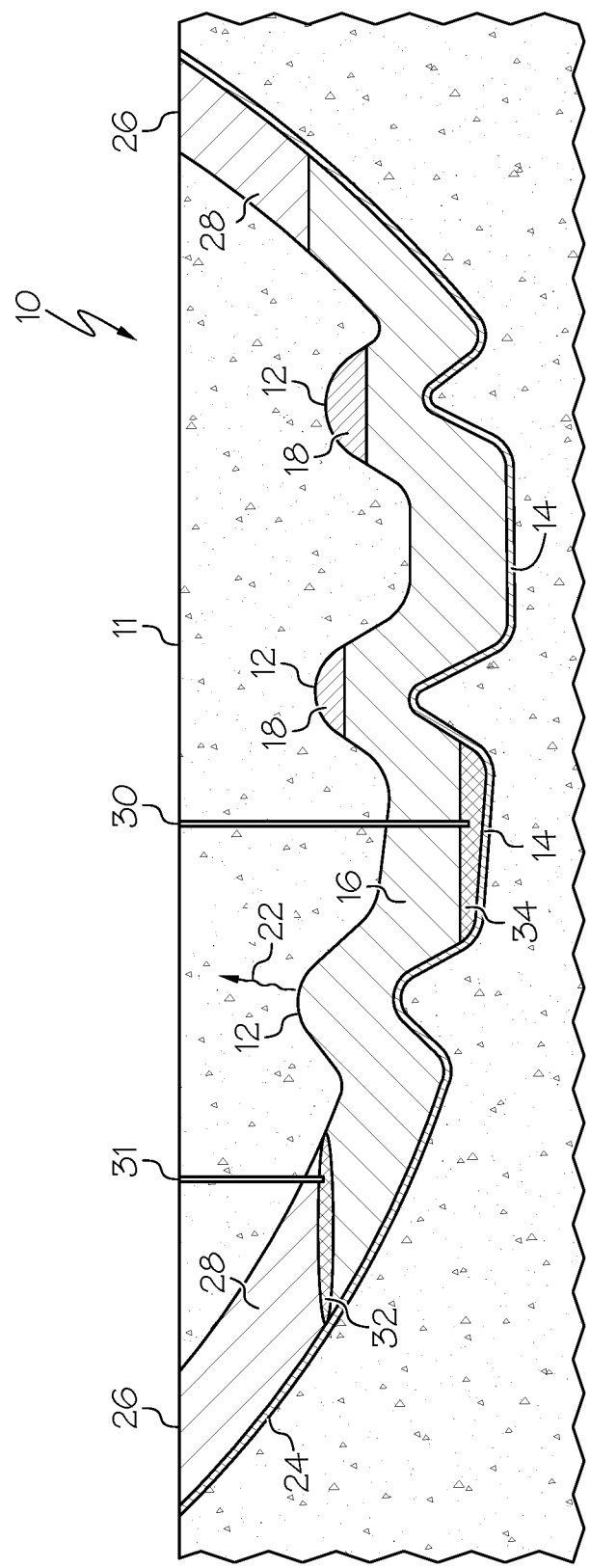
FIG. 2 is a schematic of a geological basin suitable for embodiments described herein.

As shown in FIG. 2, one embodiment of a geological basin 10 includes one or more onshore margins 26 where the reservoir is exposed at surface. Therefore, freshwater 28 may be able to ingress into the subterranean reservoir of the geological basin, assuming the layout of the geological basin 10 is such that the freshwater is driven into the geological basin 10 by hydrostatic head arising from inland topography (not shown) and the in situ saline fluids can escape within the geological basin 10 via local topseal leak points. As a result, the geological basin 10 may have a region of relatively higher density fluid in the form of the saline water 16 and a region of relatively lower density freshwater 28.

As shown in FIG. 2, regardless of the presence of the freshwater 28, injection line 30 may be used to inject a mixture comprising water and $CO_2$. The resulting aqueous $CO_2$ solution may accumulate in pool 34. In embodiments, injection line 31 may be used to inject a mixture comprising water and $CO_2$ at the interface of the freshwater 28 and the saline water 16. In embodiments, the aqueous $CO_2$ solution may be more dense than freshwater 28 and less dense than the saline water 16, thus forming pool 32 between freshwater 28 and the saline water 16. In embodiments, the aqueous $CO_2$ solution may be more dense than both any freshwater 28 present and the saline water 16, thus forming pool 34 in subsurface sequestration location 14.

In embodiments, the saline water 16 may have a density rising from 1 g/mL (fresh water) to 1.2 g/mL. For example, the density may be from 1 g/ml to 1.15 g/ml, from 1 g/ml to 1.1 g/ml, from 1 g/ml to 1.05 g/ml, from 1.05 g/ml to 1.2 g/ml, from 1.1 g/ml to 1.2 g/ml, or even from 1.15 g/ml to 1.2 g/ml.

In embodiments, the mixture comprising water and $CO_2$ that accumulates in pool 32 or pool 34 may have a density up to 15% higher than the density of the water or brine into which it has been dissolved, such as up to 14% higher, up to 13% higher, up to 12% higher, up to 11% higher, up to 10% higher, up to 9% higher, up to 8% higher, up to 7% higher, up to 6% higher, up to 5% higher, up to 4% higher, up to 3% higher, up to 2% higher, or even up to 1% higher. Of course, if the density of this mixture is between that of the saline water 16 and the fresh water 28, the mixture will form an intermediate layer, such as shown by pool 32. However, if the density of this mixture is greater than that of the saline water 16 (thereby being greater than that of the fresh water 28), the mixture will form the pool 34 at the subsurface sequestration location 14.

Having described geological basins above, embodiments disclosed herein take advantage of the features of these geological basins for sequestration of $CO_2$. A method of subsurface sequestration of $CO_2$ in a geological basin may include identifying one or more subsurface sequestration locations in the geological basin that are suitable for negatively buoyant fluids. Any method of subsurface mapping that may be standard in, for example, the fields of oil and gas exploration, may be used to identify structural highs and the associated sequestration locations. In embodiments, the mapping may be performed by reflection seismic mapping, which uses 2-dimensional seismic data or 3-dimensional seismic data to form a subsurface map of the area under study. Reflection seismic data mapping may be augmented (also referred to as "ground truthed") by drilled wells (also referred to as "subterranean bores") to ensure the accuracy of depth on these maps. In embodiments, maps may be constructed from well data alone when a sufficient number of such wells are drilled into the area under study. It may also be possible to use potential field data, such as gravity data, magnetism, or both gravity data and magnetism, to identify structural highs and the associated sequestration locations. In embodiments, more than one method of identifying the subsurface sequestration locations may be used. Regardless of the methods used, highs and lows are intrinsic properties of any depth map that is produced. In embodiments, height or depth sufficiency may be determined by the volume represented by the trap, which volume is itself a product of the height and area, as well as the reservoir properties.

After one or more subsurface sequestration locations are identified in the geological basin, an aqueous $CO_2$ solution may be injected into the geological basin. In embodiments, the aqueous solution may comprise enough $CO_2$ that the density of the resulting aqueous solution is up to 15% higher than the density of the water or brine into which it has been dissolved, such as from 1% higher to 15% higher, from 2% higher to 15% higher, from 3% higher to 15% higher, from 4% higher to 15% higher, from 5% higher to 15% higher, from 6% higher to 15% higher, from 7% higher to 15% higher, from 8% higher to 15% higher, from 9% higher to 15% higher, from 10% higher to 15% higher, from 1% higher to 14% higher, from 1% higher to 13% higher, from 1% higher to 12% higher, from 1% higher to 11% higher, from 1% higher to 10% higher, from 1% higher to 9% higher, from 1% higher to 8% higher, from 1% higher to 7% higher, from 1% higher to 6% higher, or even from 1% higher to 5% higher. In embodiments, the concentration of $CO_2$ in the aqueous solution may be sufficiently high such that the aqueous solution is more dense than the water naturally present in the geological basin. Dissolving additional $CO_2$ in the aqueous solution is expected to further increase the density of the aqueous solution.

In embodiments, the density of the water naturally present in the geological basin, i.e. the saline water, may be determined by obtaining a sample of the water of known volume and weighing it with an accurate measuring device, having ensured the sample has remained unaltered between the sampling and the weighing. This can be accomplished in the subsurface by extracting a sample with a downhole sampling tool, such as a Modular Formation Dynamics Tester from Schlumberger, for example. In embodiments, the density of the saline water may be determined by taking a set of vertically-spaced pressure points and determining the fluid density from the pressure gradient.

In one or more embodiments, the aqueous solution may include one or more of deionized, tap, distilled, or fresh waters; natural, brackish, or saturated salt waters; formation water produced as a byproduct of hydrocarbon production; synthetic brines; filtered or untreated seawaters; mineral waters; or other potable or non-potable waters containing one or more dissolved salts, minerals, or organic materials. In embodiments, the aqueous solution may comprise filtered seawater. In embodiments, the aqueous solution may comprise untreated seawater. In one or more embodiments, the aqueous solution may comprise at least 80 wt.%, at least 90 wt.%, at least 95 wt.%, at least 99 wt.%, or even at least 99.9 wt.% of water.

In one or more embodiments, at least 90 wt.%, at least 95 wt.%, or even at least 99 wt.% of the aqueous solution by mass may be a brine solution. As used herein, the term "brine" may refer to a saturated solution of one or more alkali metal chlorides. For example, "brine" may refer to a saturated solution of NaCl, KCl, or mixtures thereof. Alternatively, the term "brine" may refer to naturally derived saltwater, for example, seawater or salt lake water, used in its natural state or after having undergone processing, such as filtration, to remove contaminants and large particles. In one or more embodiments, the aqueous solution may consist of brine.

In embodiments, the aqueous solution may include a portion of the saline water. Including $CO_2$ in the saline water produces an aqueous solution that is more dense than the saline water alone. In embodiments, the aqueous solution may include seawater.

In one or more embodiments, previously drilled exploratory wells may be used for injecting the aqueous solution into the geological basin. In the same or different embodiments, at least one previously drilled pressure observation well may be used for injecting the aqueous solution into the geological basin. In the same or different embodiments, at least one previously drilled production well may be used for injecting the aqueous solution into the geological basin.

Once injected into the geological basin, the $CO_2$ may be retained within the geological basin for long periods of time. That is, no measurable amount of $CO_2$ may be released from the geological basin for at least 1 year, at least 5 years, at least 10 years, or at least 15 years. Of course, the $CO_2$ may be retained with the geological basin for 100 years or more, for instance for 2000 years or more, for 3000 years or more, for 4000 years or more, or even for 5000 years or more.

The subject matter described herein has many advantages. By injecting relatively dense fluids that will pond in structural lows between structural highs, these low areas may serve a purpose in the hydrocarbon production cycle through restoration of pressure within the vicinity of producing hydrocarbon fields and increasing the ultimate proportion of recovered hydrocarbons. Moreover, by focusing on structural lows, $CO_2$ sequestration will not interfere with engineering activity tied to structural highs, such as ongoing oil or gas production. Choosing structural lows adjacent to structural highs that host active oil or gas deposits also introduces a synergy wherein produced reservoir water, a feature of all mature oil or gas production projects, may be added to the aqueous solution. This may provide a ready source of a solvent for the $CO_2$ and also conveniently dispose of the produced reservoir water that typically includes a high amount of dissolved species.

According to a first aspect, either alone or in combination with any other aspect, a method of subsurface sequestration of $CO_2$ in a geological basin includes identifying one or more subsurface sequestration locations in the geological basin and injecting an aqueous $CO_2$ solution to be sequestered into the geological basin. The one or more subsurface sequestration locations are regions of deeper geological structure, relative to an adjacent shallower geological structure, into which a negatively buoyant fluid injected into the basin will sink. The aqueous $CO_2$ solution comprises a density that is greater than the density of the water naturally present in the geological basin, such that the injected aqueous $CO_2$ solution pools in the one or more subsurface sequestration locations.

According to a second aspect, either alone or in combination with any other aspect, identifying the one or more subsurface sequestration locations in the geological basin comprises performing subsurface mapping.

According to a third aspect, either alone or in combination with any other aspect, the subsurface mapping comprises reflection seismic mapping.

According to a fourth aspect, either alone or in combination with any other aspect, the subsurface mapping produces a map of the geological basin and the map of the geological basin is confirmed by drilling a plurality of subterranean bores, thereby confirming a depth of the deeper geological structure and the shallower geological structure.

According to a fifth aspect, either alone or in combination with any other aspect, identifying one or more subsurface sequestration locations in the geological basin comprises: drilling a plurality of subterranean bores in the geological basin; measuring a depth of each of the subterranean bores; and determining a three-dimensional subterranean profile of the geological basin by combining the measured depths of each of the subterranean bores into a composite map of subterranean structures of the area.

According to a sixth aspect, either alone or in combination with any other aspect, identifying one or more subsurface sequestration locations in the geological basin comprises measuring gravity, magnetism, or gravity and magnetism of the area, thereby identifying subterranean geological features of the geological basin.

According to a seventh aspect, either alone or in combination with any other aspect, the aqueous solution comprises water selected from the group consisting of deionized water; tap water; distilled water; fresh water; natural salt water; brackish salt water; saturated salt water; formation water produced as a byproduct of hydrocarbon production; synthetic brine; filtered seawater; untreated seawater; mineral waters; potable water containing one or more dissolved salts, minerals, and organic materials; non-potable water containing one or more dissolved salts, minerals, and organic materials; and a combination of two or more thereof.

According to an eighth aspect, either alone or in combination with any other aspect, the aqueous solution comprises filtered seawater.

According to a ninth aspect, either alone or in combination with any other aspect, the aqueous solution comprises untreated seawater.

According to a tenth aspect, either alone or in combination with any other aspect, determining the density of the water naturally present in the geological basin comprises determining a fluid density calculated from a plurality of vertically spaced pressure measurements taken above the geological basin.

According to an eleventh aspect, either alone or in combination with any other aspect, injecting the aqueous solution into the geological basin comprises injecting the aqueous solution into at least one previously drilled exploratory well, at least one previously drilled pressure observation well, at least one previously drilled production well, or a combination of two or more thereof.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

The singular forms "a," "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

What is claimed is:

1. A method of subsurface sequestration of $CO_2$ in a geological basin, the method comprising:
    identifying one or more subsurface sequestration locations in the geological basin, the geological basin comprising:
        one or more deeper geological structure regions comprising the one or more subsurface sequestration locations, and
        one or more shallower geological structure regions, the one or more deeper geological structure regions being at a greater depth than the one or more shallower geological structure regions;
    injecting an aqueous $CO_2$ solution comprising water and $CO_2$ that is dissolved in the water into the geological basin, wherein the aqueous $CO_2$ solution has a density that is greater than the density of in situ water naturally present in the geological basin making the aqueous $CO_2$ solution a negatively buoyant fluid in the in situ water naturally present in the geological basin; and
    allowing the injected aqueous $CO_2$ solution to sink below the in situ water naturally present in the geological basin and pool into the one or more subsurface sequestration locations, thereby sequestering the $CO_2$ in the geological basin.

2. The method of claim 1, wherein identifying the one or more subsurface sequestration locations in the geological basin comprises performing subsurface mapping.

3. The method of claim 2, wherein the subsurface mapping comprises reflection seismic mapping.

4. The method of claim 2, wherein the subsurface mapping produces a map of the geological basin and the map of the geological basin is confirmed by drilling a plurality of subterranean bores, thereby confirming a depth of the one or more deeper geological structure regions and the one or more shallower geological structure regions.

5. The method of claim 1, wherein identifying one or more subsurface sequestration locations in the geological basin comprises:
    drilling a plurality of subterranean bores in the geological basin;
    measuring a depth of each of the subterranean bores; and
    determining a three-dimensional subterranean profile of the geological basin by combining the depths of each of the subterranean bores into a composite map of subterranean structures of the geological basin.

6. The method of claim 1, wherein identifying one or more subsurface sequestration locations in the geological basin comprises measuring gravity, magnetism, or gravity and magnetism of the geological basin, thereby identifying subterranean geological features of the geological basin.

7. The method of claim 1, wherein the water is selected from the group consisting of deionized water; tap water; distilled water; fresh water; natural salt water; brackish salt water; saturated salt water; formation water produced as a byproduct of hydrocarbon production; synthetic brine; filtered seawater; untreated seawater; mineral waters; potable water containing one or more dissolved salts, minerals, and organic materials; non-potable water containing one or more dissolved salts, minerals, and organic materials; and a combination of two or more thereof.

8. The method of claim 1, wherein the water is filtered seawater.

9. The method of claim 1, wherein the water is untreated seawater.

10. The method of claim 1, wherein determining the density of the in situ water naturally present in the geological basin comprises determining a fluid density calculated from a plurality of vertically spaced pressure measurements taken above the geological basin.

11. The method of claim 1, wherein injecting the aqueous $CO_2$ solution into the geological basin comprises injecting the aqueous $CO_2$ solution into at least one previously drilled exploratory well, at least one previously drilled pressure observation well, at least one previously drilled production well, or a combination of two or more thereof.

12. The method of claim 1, wherein no measurable amount of the $CO_2$ to be sequestered is released from the geological basin over at least one year.

13. The method of claim 1, wherein the water comprises the in-situ water naturally present in the geological basin.

14. The method of claim 13, wherein the in-situ water naturally present in the geological basin comprises saline water, freshwater, or both.

15. The method of claim 13, wherein the presence of the $CO_2$ with the water in the aqueous $CO_2$ solution results in the aqueous $CO_2$ solution having a density greater than the water or the in-situ water.

16. The method of claim 13, wherein the aqueous $CO_2$ solution has a density of from 1% to 15% higher than the density of the water.

* * * * *